United States Patent
Wirth et al.

(10) Patent No.: US 9,752,464 B2
(45) Date of Patent: Sep. 5, 2017

(54) SUPERCHARGED APPLIED IGNITION INTERNAL COMBUSTION ENGINE WITH EXHAUST-GAS TURBOCHARGING AND METHOD FOR OPERATING AN INTERNAL COMBUSTION ENGINE OF SAID TYPE

(71) Applicant: Ford Global Technologies, LLC, Dearborn, MI (US)

(72) Inventors: Martin Wirth, Remscheid (DE); Klemens Grieser, Langenfeld (DE); Marco Marceno, Hagen (DE); Kay Hohenboeken, Cologne (DE); Jan Linsel, Cologne (DE); Harald Stoffels, Cologne (DE); Ludwig Stump, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 14/723,009

(22) Filed: May 27, 2015

(65) Prior Publication Data

US 2015/0345410 A1 Dec. 3, 2015

(30) Foreign Application Priority Data

May 28, 2014 (DE) .............................. 102014210220
Jun. 20, 2014 (DE) .............................. 102014211835

(51) Int. Cl.
*F01L 1/34* (2006.01)
*F02D 13/02* (2006.01)
(Continued)

(52) U.S. Cl.
CPC ............ *F01L 1/34* (2013.01); *F02D 13/0203* (2013.01); *F02D 37/02* (2013.01); *F02D 41/0007* (2013.01); *F02P 5/045* (2013.01); *F02P 5/1528* (2013.01); *F02D 35/023* (2013.01); *F02D 41/0087* (2013.01); *F02D 2041/001* (2013.01); *F02D 2200/0414* (2013.01); *F02D 2200/0602* (2013.01); *F02D 2200/101* (2013.01); *F02D 2200/703* (2013.01); *Y02T 10/144* (2013.01); *Y02T 10/18* (2013.01); *Y02T 10/46* (2013.01)

(58) Field of Classification Search
CPC ............ F02D 13/0203; F02D 41/0007; F02D 2041/001; F01L 1/34
See application file for complete search history.

(56) References Cited

U.S. PATENT DOCUMENTS 5,233,948 A * 8/1993 Boggs ..................... F02B 41/04
123/432
6,832,583 B2 12/2004 Hayman
(Continued)

FOREIGN PATENT DOCUMENTS

DE 10122775 A1 11/2001
DE 102004026405 A1 12/2005
(Continued)

*Primary Examiner* — Audrey K Bradley
(74) *Attorney, Agent, or Firm* — Julia Voutyras; McCoy Russell LLP

(57) ABSTRACT

A turbocharged internal combustion engine is provided with at least a partially variable valve train on an intake side wherein the intake valves are controlled to optimize the actuation of a second inlet valve in relation to a first inlet valve for different load conditions.

9 Claims, 6 Drawing Sheets

(51) Int. Cl.
*F02D 41/00*        (2006.01)
*F02P 5/04*         (2006.01)
*F02P 5/152*        (2006.01)
*F02D 37/02*        (2006.01)
*F02D 35/02*        (2006.01)

(56) References Cited

U.S. PATENT DOCUMENTS

| | | |
|---|---|---|
| 7,331,317 B2 | 2/2008 | Yasui et al. |
| 7,540,270 B2 | 6/2009 | Kang et al. |
| 2003/0131805 A1 | 7/2003 | Yang |
| 2007/0215106 A1* | 9/2007 | Petridis ............... F01L 1/25 123/347 |
| 2010/0212618 A1* | 8/2010 | Murata ............... F01L 1/053 123/90.17 |
| 2011/0107992 A1* | 5/2011 | Murata ............ F02D 13/0238 123/90.17 |
| 2011/0174268 A1 | 7/2011 | Surnilla et al. |
| 2013/0024093 A1* | 1/2013 | Murai ................ F02D 41/30 701/104 |
| 2013/0180485 A1 | 7/2013 | Kamio |
| 2015/0059668 A1* | 3/2015 | Ha ..................... F01L 1/34 123/90.15 |

FOREIGN PATENT DOCUMENTS

| | | |
|---|---|---|
| DE | 102010034956 A1 | 6/2011 |
| DE | 102011104837 A1 | 12/2011 |
| DE | 112009005130 A1 | 6/2012 |
| WO | 2009042821 A1 | 4/2009 |

* cited by examiner

SUPERCHARGED APPLIED IGNITION INTERNAL COMBUSTION ENGINE WITH EXHAUST-GAS TURBOCHARGING AND METHOD FOR OPERATING AN INTERNAL COMBUSTION ENGINE OF SAID TYPE

CROSS REFERENCE TO RELATED APPLICATIONS

The present application claims priority to German Patent Application No. 102014210220.0, filed May 28, 2014, and German Patent Application No. 102014211835.2, filed Jun. 20, 2014, the entire contents of each of which are hereby incorporated by reference for all purposes.

FIELD

The present disclosure relates to a method and system for controlling intake valve timing of an intake system arranged in an internal combustion engine with exhaust-gas turbocharging and knock regulator.

BACKGROUND\SUMMARY

Engines may use boosting devices, such as turbochargers, to increase engine power density. However, engine knock may occur due to increased combustion temperatures during boosted conditions. At higher loads, the engine may be more knock-limited which may result in undesired late combustion phasing.

The engine knock may be addressed by retarding spark timing such as described in US20030131805 A1. In another example, systems with fixed long intake cams, such as in Atkinson engines and as shown in US20030131805 A1 as well, may be used for knock control.

The inventors herein have identified potential issues, including issues with the above approaches to addressing knock limits. For example, significant spark retard can reduce fuel economy and limit maximum torque. Further, fixed long intake cams may be optimized as a compromise between part and full load conditions.

The inventors herein have recognized the above issues and identified approaches to at least partly address the issues. In one example approach, a supercharged engine comprises at least one cylinder head with at least one cylinder, each cylinder having at least two inlet openings for the supply of charge air via an intake system and at least one outlet opening for the discharge of the exhaust gases via an exhaust-gas discharge system, at least one throttle flap which is arranged in the intake system and which serves for load control, and at least one exhaust-gas turbocharger, each exhaust-gas turbocharger comprising a turbine arranged in the exhaust-gas discharge system and a compressor arranged in the intake system. Further, at least two at least partially variable valve drives may be provided, the valve drives having at least two valves which may be movable between a valve closed position and a valve open position in order to open up and block the at least two inlet openings of the at least one cylinder, wherein a valve spring means for may preload the valves in the direction of the valve closed position. The at least partially variable valve drives may have at least two actuating devices for opening the valves counter to the preload force of the valve spring means, each actuating device comprising a cam which is arranged on a camshaft and which, as the camshaft rotates, may be brought into engagement with at least one cam follower element, whereby the associated valve is actuated, and the cams of the at least two actuating devices of the at least two at least partially variable valve drives may be rotatable relative to one another. Further, the at least two valves may be actuated based on a desired manifold pressure and a corrective factor based on a boost pressure.

In one example, the opening and closing of the inlet valves may be adjusted depending on the load and engine operating conditions. For example, closing time of the second inlet valve may be determined by determining a base closing time using a present engine speed and a present desired value for a pressure in an intake system, and corrected for turbocharging by determining an additive closing time based on boost pressure. In this way, a cam event may be elongated so that part of the air charge may be pushed back into the intake system in order to lower the actual compression ratio, which may result in increased efficiency, fuel economy, higher torque, and a combustion process that is less knock-limited. Further, a correction in the closing time of the inlet valve accounting for a knock regulator output, may be used to retard the closing of a second inlet valve further. In this way, the method may reduce or substantially eliminate the need for retarding ignition spark, thus further increasing efficiency. Overall, a turbocharged engine can be operated with less spark retard from maximum torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
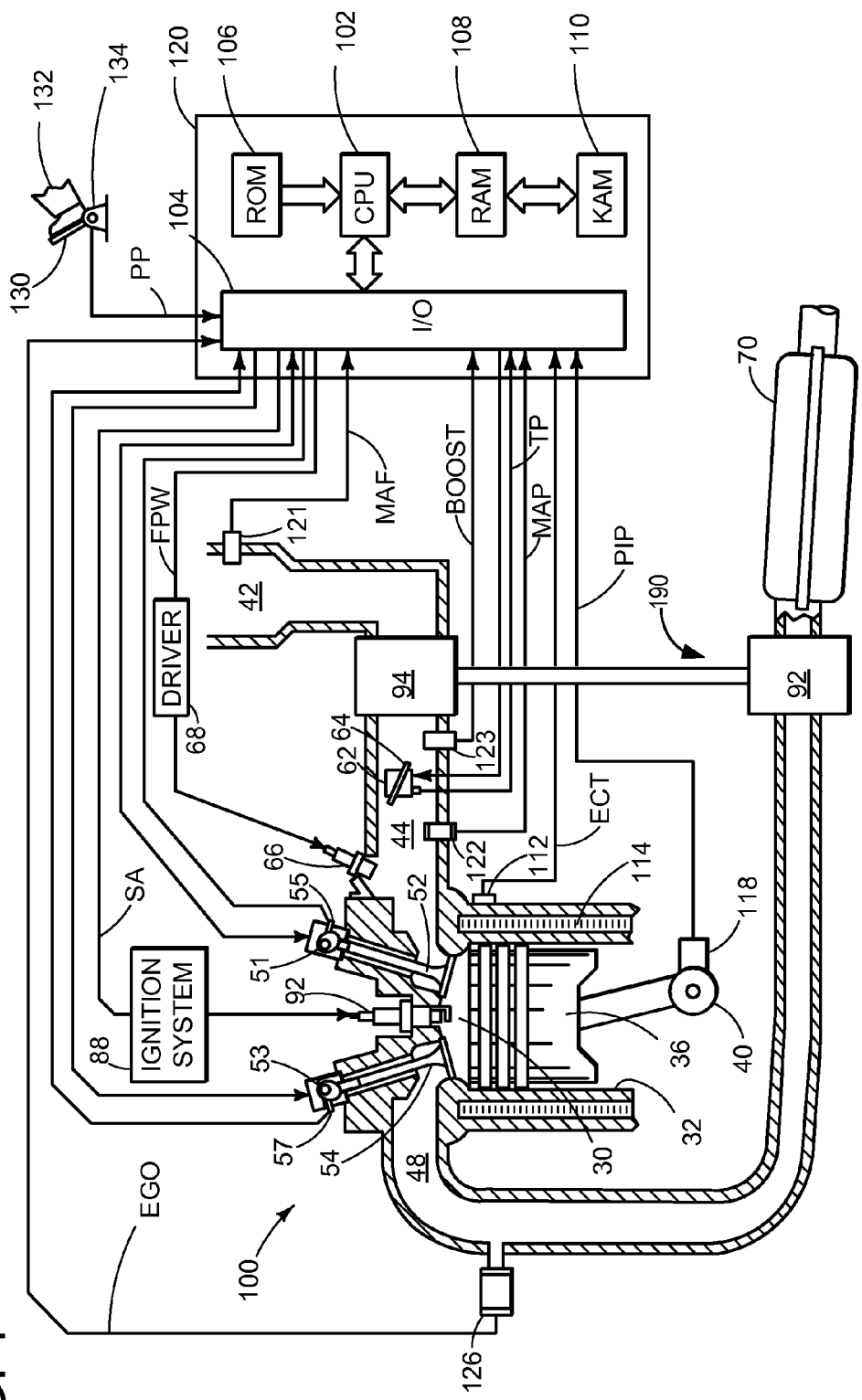
FIG. 1 schematically depicts an example vehicle system including a cam actuation system.

The present application relates to a supercharged applied-ignition internal combustion engine comprising at least one cylinder head with at least one cylinder, each cylinder having at least two inlet openings for the supply of charge air via an intake system and at least one outlet opening for the discharge of the exhaust gases via an exhaust-gas discharge system, at least one throttle flap which is arranged in the intake system and which serves for load control, and at least one exhaust-gas turbocharger is provided, each exhaust-gas turbocharger comprising a turbine arranged in the exhaust-gas discharge system and a compressor arranged in the intake system, and a knock regulator which, as output signal, provides an ignition retardation $\Delta_{ignition}$ required for the prevention of knocking.

The present application also relates to a method for operating an internal combustion engine of said type, with each cylinder comprising two inlet openings for the supply of charge air via an intake system.

An internal combustion engine of the above-stated type is used as a drive for motor vehicles. Within the context of the present application, the expression "internal combustion engine" encompasses Otto-cycle engines and also hybrid internal combustion engines, which utilize a hybrid combustion process, and hybrid drives which comprise not only the internal combustion engine but also an electric machine which may be connected in terms of drive to the internal combustion engine and which receives power from the internal combustion engine or which, as a switchable auxiliary drive, additionally outputs power.

Internal combustion engines have a cylinder block and at least one cylinder head which are connected to one another to form the at least one cylinder or combustion chamber. To hold the pistons or the cylinder liners, the cylinder block has a corresponding number of cylinder bores. The cylinder head conventionally serves to hold the valve drive. To control the charge exchange, an internal combustion engine requires control elements and actuating devices for actuating the control elements. During the charge exchange, the combustion gases are discharged via the outlet openings and the charging of the combustion chamber with charge air takes place via the inlet openings. To control the charge exchange, in four-stroke engines, use is made almost exclusively of lifting valves as control elements, which lifting valves perform an oscillating lifting movement during the operation of the internal combustion engine and which lifting valves open and close the inlet and outlet openings in this way. The actuating device required for the movement of a valve, including the valve itself, is referred to as the valve drive.

An actuating device comprises a camshaft on which at least one cam is arranged. A basic distinction is made between an underlying camshaft and an overhead camshaft. This relates to the parting plane between the cylinder head and cylinder block. If the camshaft is arranged above said parting plane, it is an overhead camshaft, otherwise it is an underlying camshaft.

Overhead camshafts are likewise mounted in the cylinder head, wherein a valve drive with overhead camshaft may, as a further valve drive component, have a rocker lever, a finger-type rocker, a tilting lever and/or a tappet. Said cam follower elements are situated in the force flow between cam and valve.

It is the object of the valve drive to open and close the inlet and outlet openings of a cylinder at the correct times, with a fast opening of the greatest possible flow cross sections being sought in order to keep the throttling losses in the inflowing and outflowing gas flows low and in order to ensure the best possible charging of the cylinder, and a complete discharge of the exhaust gases. According to some approaches, therefore, a cylinder is also often and increasingly provided with two or more inlet and outlet openings.

In the development of internal combustion engines, it is a basic aim to minimize fuel consumption, wherein the emphasis in the efforts being made is on obtaining an improved overall efficiency.

Fuel consumption and thus efficiency pose a problem, for example in the case of Otto-cycle engines, that is to say in the case of applied-ignition internal combustion engines. The reason for this lies in the principle of the operating process of the Otto-cycle engine. Load control is generally carried out by means of a throttle flap provided in the intake system. By adjusting the throttle flap, the pressure of the inducted air downstream of the throttle flap may be reduced to a greater or lesser extent. The further the throttle flap is closed, that is to say the more said throttle flap blocks the intake system, the higher is the pressure loss of the inducted air across the throttle flap, and the lower is the pressure of the inducted air downstream of the throttle flap and upstream of the inlet into the at least one cylinder, that is to say combustion chamber. For a constant combustion chamber volume, it is possible in this way for the air mass, that is to say the quantity, to be set by means of the pressure of the inducted air. This also explains why quantity regulation has proven to be disadvantageous specifically in part-load operation, because low loads require a high degree of throttling and a pressure reduction in the intake system, as a result of which the charge exchange losses increase with decreasing load and increasing throttling.

To reduce the described losses, various strategies for dethrottling an Otto-cycle engine have been developed.

One approach to a solution for dethrottling the Otto-cycle engine is for example an Otto-cycle engine operating process with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by direct injection of the fuel into the cylinder or into the air situated in the cylinder, and not by external mixture formation, in which the fuel is introduced into the inducted air in the intake system.

A further approach to a solution for optimizing the combustion process of an Otto-cycle engine consists in the use of an at least partially variable valve drive. By contrast to conventional valve drives, in which both the lift of the valves and the timing are invariable, these parameters which have an influence on the combustion process, and thus on fuel consumption, may be varied to a greater or lesser extent by means of variable valve drives. If the valve drive is partially variable or switchable and, for example, the closing time of the inlet valve and the inlet valve lift may be varied, this alone makes throttling-free and thus loss-free load control possible. The mixture mass or charge air mass which flows into the combustion chamber during the intake process is then controlled not by means of a throttle flap but rather by means of the inlet valve lift and the opening duration of the inlet valve. Fully variable valve drives are very expensive, for which reason use is often made of partially variable or switchable valve drives. Within the context of the present application, switchable valve drives are regarded as partially variable valve drives.

In this connection, it must also be taken into consideration that the efficiency $\eta$ of the Otto-cycle engine at least approximately correlates with the compression ratio $\epsilon$. That is to say, the efficiency $\eta$ increases with the compression ratio $\epsilon$, is generally higher in the presence of a relatively high compression ratio, and is generally lower in the presence of a relatively low compression ratio.

With regard to efficiency, the cylinders would thus may be provided with the highest possible compression ratio. The compression ratio however cannot be increased to an arbitrary extent because, with increasing compression ratio, the knocking tendency, that is to say the tendency for auto-ignition of mixture components, increases. Modern Otto-cycle engines generally have compression ratios of approximately 8 to 10, with a compression ratio of approximately 15 promising the best efficiency. In this way, although efficiency is limited, the required resistance to knocking, for example at high loads, is ensured. According to some approaches, the knocking tendency is also counteracted by virtue of the ignition being retarded as required, whereby the combustion center of gravity is retarded and the combustion pressure and combustion temperature decrease. For this purpose, modern Otto-cycle engines are equipped with a knock regulator which, as output signal, provides an ignition retardation required for the prevention of knocking. The ignition retardation however has an adverse effect on the efficiency.

The internal combustion engine to which the present application relates has a knock regulator of said type, and also at least one exhaust-gas turbocharger. The advantage of an exhaust-gas turbocharger in relation to a mechanical charger is that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

An exhaust-gas turbocharger comprises a compressor arranged in the intake system and a turbine arranged in the exhaust-gas discharge system, which compressor and turbine are arranged on the same shaft. The hot exhaust-gas flow is supplied to the turbine and expands in said turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the at least one cylinder is obtained. A charge-air cooling arrangement may be provided, by means of which the compressed charge air is cooled before it enters the cylinder.

Supercharging serves primarily to increase the power of the internal combustion engine. Here, the air required for the combustion process is compressed, as a result of which a greater air mass may be supplied to each cylinder per working cycle. In this way, the fuel mass and therefore the mean pressure may be increased. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, at which the specific fuel consumption is lower and the efficiency is higher.

Against the background of that stated above, it is an object of the present application to provide a supercharged applied-ignition internal combustion engine according to the preamble of claim 1, which is optimized with regard to operating behavior, for example with regard to fuel consumption and efficiency.

It is a further sub-object to specify a method for operating an internal combustion engine of said type, wherein each cylinder comprises two inlet openings for the supply of charge air via an intake system, and each piston belonging to a cylinder oscillates between a top dead center and a bottom dead center.

The first sub-object is achieved by means of a supercharged applied-ignition internal combustion engine comprising at least one cylinder head with at least one cylinder, each cylinder comprising at least two inlet openings for the supply of charge air via an intake system and at least one outlet opening for the discharge of the exhaust gases via an exhaust-gas discharge system, at least one throttle flap which is arranged in the intake system and which serves for load control, and at least one exhaust-gas turbocharger is provided, each exhaust-gas turbocharger comprising a turbine arranged in the exhaust-gas discharge system and a compressor arranged in the intake system, and a knock regulator which, as output signal, provides an ignition retardation $\Delta_{ignition}$ required for the prevention of knocking, which internal combustion engine is distinguished by the fact that at least two at least partially variable valve drives are provided, the valve drives comprising at least two valves which are movable between a valve closed position and a valve open position in order to open up and block the at least two inlet openings of the at least one cylinder, having valve spring means for preloading the valves in the direction of the valve closed position, and having at least two actuating devices for opening the valves counter to the preload force of the valve spring means, each actuating device comprising a cam which is arranged on a camshaft and which, as the camshaft rotates, is brought into engagement with at least one cam follower element, whereby the associated valve is actuated, and the cams of the at least two actuating devices of the at least two at least partially variable valve drives being rotatable relative to one another.

According to the present application, the timings of the inlet valves of a cylinder may be varied.

In the present case, the cams of the valve actuating devices which belong to the inlet valves of a cylinder, may be rotated relative to one another, such that the inlet valves belonging to a cylinder may not only be actuated synchronously, that is to say opened and closed simultaneously. Rather, the cams, belonging to the inlet valves or inlet openings of a cylinder, may be rotated relative to one another such that a first inlet valve is actuated earlier than a second inlet valve. The timings of the inlet valves then have an offset, hereinafter also referred to as control offset $\Delta$. This control offset makes it possible to vary the inlet-side opening duration, wherein the opening duration extends from the opening of the first inlet valve to the closing of the second inlet valve.

The variable valve drives on the inlet side permit an adaptation of the timings of the inlet valves to the present operating state of the internal combustion engine, for example an adaptation to the present load and to the present knocking tendency. In this connection, the adaptation of the inlet-side opening duration to the present operating state of the internal combustion engine is of particular interest.

With regard to low fuel consumption, a large inlet-side opening duration, that is to say an inlet-side opening duration which is as long as possible, may be preferable in part-load operation in the presence of low loads. In this context, a high compression ratio is additionally conducive to reducing fuel consumption In the presence of increased load, it is then the case in part-load operation up to medium loads that a shorter inlet-side opening duration is desired in order to ensure the best possible charging of the cylinder. The background to this measure is the increase of the torque at medium loads, that is to say the improvement of the torque characteristic of the internal combustion engine.

Toward higher loads, the operation of the internal combustion engine is progressively limited owing to the fact that knocking should be reliably prevented under all circumstances. According to some approaches, knocking is counteracted by virtue of the ignition time being retarded. In this case, losses in efficiency are accepted.

By contrast, according to the present application, the effective compression ratio $\epsilon_{\mathit{eff}}$ may be lowered by lengthening the inlet-side opening duration or through retarded closing of one inlet valve, for example of the second inlet valve, wherein, with an inlet still open, a part of the cylinder fresh charge is displaced into the intake system again during the compression stroke. A high geometric compression ratio $\epsilon_{\mathit{geo}}$, which is basically to be regarded as advantageous and which, at relatively low loads, is highly conducive to improving efficiency, may in this way be mitigated at relatively high loads According to the present application, when there is a risk of knocking, at least the second inlet valve is closed later and after bottom dead center, wherein a closing time retardation $\Delta t_{\mathit{intake,closing,knock}}$ by which the closure of the second inlet valve is to be retarded is determined using a present engine speed $n_{\mathit{mot}}$ and an ignition retardation output by the knock regulator. The retardation of the ignition time, such as is required according to some approaches, is omitted, along with the associated efficiency losses. It is however at least the case that the required ignition retardation may be reduced.

The internal combustion engine according to the present application achieves the first object on which the present application is based, specifically that of providing an internal combustion engine which is optimized with regard to operating behavior, for example with regard to fuel consumption and efficiency.

According to the present application, the cams of the inlet valves of a cylinder are rotatable relative to one another. In this case, the timings of the valves may be shifted relative to one another while maintaining the valve opening duration of each valve, such that the inlet-side opening duration of the associated cylinder may be lengthened or shortened. The valve overlap of the valves may be varied.

This adjustment possibility requires at least one rotatable cam. In a first alternative, a cam which is designed to be adjustable is rotated relative to the crankshaft, whereas the at least one other cam is designed as an immovable, static cam. In a second alternative, the at least two cams are designed as adjustable cams which are rotatable relative to one another and relative to the crankshaft.

Further advantageous embodiments of the internal combustion engine according to the present application will be explained in conjunction with the subclaims.

Embodiments of the internal combustion engine are advantageous in which the cams are arranged on an at least two-part camshaft which comprises at least two camshaft sections that are rotatable relative to one another, wherein at least one cam is arranged on a first camshaft section and at least one cam is arranged on a second camshaft section. An example of a camshaft of the above type is described in German laid-open specification DE 10 2010 008 958 A1.

Here, embodiments of the internal combustion engine are advantageous in which the at least two-part camshaft comprises, as first camshaft section, a hollow shaft and, as second camshaft section, a shaft arranged rotatably in the hollow shaft.

In the case of internal combustion engines with a crankshaft which is at least connectable in terms of drive to the camshaft, embodiments are also advantageous in which the cams are rotatable relative to the crankshaft, for example with one another and relative to the crankshaft.

In this case, the cams may be rotated individually or, as in the case of a camshaft adjuster, rotated conjointly and similarly relative to the crankshaft. In the latter variant, the timings of the associated valves are jointly retarded or advanced while maintaining the respective valve opening duration.

Embodiments of the internal combustion engine are advantageous in which the cams have the same contour.

Embodiments of the internal combustion engine are advantageous in which each cylinder is equipped with a direct-injection means for fuel supply purposes. The direct injection of the fuel into the cylinder is a suitable means for reducing the knocking tendency of the Otto-cycle engine, and is thus a measure for improving efficiency.

Embodiments of the internal combustion engine are advantageous in which each cylinder has a geometric compression ratio $\epsilon_{\mathit{geo}} \geq 11$.

Embodiments of the internal combustion engine are advantageous in which each cylinder has a geometric compression ratio $\epsilon_{\mathit{geo}} \geq 11.5$.

Embodiments of the internal combustion engine are advantageous in which each cylinder has a geometric compression ratio $\epsilon_{\mathit{geo}} \geq 12$.

The higher the compression ratio, the higher the efficiency, and thus the lower the fuel consumption. However, under some circumstances, higher geometric compression ratios require greater variability of the valve drive in order to be able to lower the effective compression ratio to a more pronounced or adequate extent.

Embodiments of the internal combustion engine are advantageous in which the actuating devices of the inlet valves are hydraulically adjustable actuating devices.

In the case of internal combustion engines comprising at least two cylinders, embodiments may be advantageous in which at least two cylinders are configured in such a way that they form at least two groups with in each case at least one cylinder, wherein the at least one cylinder of a first group is a cylinder which is in operation even in the event of a partial deactivation of the internal combustion engine, and the at least one cylinder of a second group is formed as a cylinder which may be switched in a load-dependent manner.

The cylinder deactivation, that is to say the deactivation of individual cylinders in certain load ranges, offers a further option for dethrottling the Otto-cycle engine. The efficiency of the Otto-cycle engine in part-load operation may be improved, that is to say increased, by means of a partial deactivation because the deactivation of one cylinder of a multi-cylinder internal combustion engine increases the load on the other cylinders, which remain in operation, if the engine power remains constant, such that the throttle flap may or must be opened further in order to introduce a greater air mass into said cylinders, whereby dethrottling of the internal combustion engine is attained overall. Furthermore, during the partial deactivation, that is to say at part load, the cylinders which are permanently in operation often operate in the region of higher loads, at which the specific fuel consumption is lower. The load collective is shifted toward higher loads.

The cylinders which remain in operation during the partial deactivation furthermore exhibit improved mixture formation owing to the greater air mass supplied. Further advantages with regard to efficiency are attained in that a deactivated cylinder, owing to the absence of combustion, may not generate any wall heat losses owing to heat transfer from the combustion gases to the combustion chamber walls.

The second sub-object on which the present application is based, specifically that of specifying a method for operating an internal combustion engine of a type described above, in which each cylinder has two inlet openings for the supply of charge air via an intake system and each piston belonging to a cylinder oscillates between a top dead center and a bottom dead center, is achieved by means of a method wherein, when there is a risk of knocking, at least the second inlet valve is closed later and after bottom dead center.

That which has been stated in connection with the internal combustion engine according to the present application likewise applies to the method according to the present application.

Method variants are advantageous in which a closing time retardation $\Delta_{tintake,closing,knock}$ by which the closure of the second inlet valve is to be retarded is determined using a present engine speed $n_{mot}$ and an ignition retardation $\Delta$ignition output by the knock regulator.

Method variants may be advantageous in which, proceeding from a relatively low load at which the cams belonging to the two inlet openings of each cylinder are rotationally offset relative to one another such that a first inlet valve may be actuated earlier than a second inlet valve, thus forming a control offset $\Delta$, in the presence of an abruptly increased load demand the throttle flap is opened further, the control offset $\Delta$ is reduced by virtue of the second inlet valve being actuated earlier, and the control offset $\Delta$ is increased again, in a manner dependent on a charge pressure generated in the intake system by exhaust-gas turbocharging, by virtue of the second inlet valve being actuated later, and when the at least one exhaust-gas turbocharger generates charge pressure.

If the internal combustion engine is used for example as a drive for a motor vehicle, an increased load may be demanded by actuating the accelerator pedal. Here, it may be the case for example in an acceleration situation that the load also increases abruptly, that is to say a step change in load is realized. The subsequent transient operation of the internal combustion engine is determined primarily by different response behaviors of the individual components that serve for setting the operating parameters. Whereas, in the presence of an abruptly increased load demand, the throttle flap may be opened further readily, that is to say virtually without a delay, the exhaust-gas turbocharger requires a certain amount of time to be able to generate, that is to say provide, the required charge pressure.

According to the present application, in the presence of an abruptly increased load demand, the throttle flap is opened further and the control offset $\Delta$ of the inlet valves is reduced by virtue of the second inlet valve being actuated earlier than before the load demand. In this case, it is assumed that, before a relatively high load is demanded, that is to say in the presence of relatively low load, the first inlet valve is actuated earlier than the second inlet valve, that is to say a control offset $\Delta$ for realizing a lengthened inlet-side opening duration is present.

This control offset $\Delta$ is now initially reduced or minimized in the presence of an abruptly increased load demand, whereby the inlet-side opening duration is shortened. A shorter inlet-side opening duration is intended to ensure the best possible charging of the at least one cylinder, and thus a high torque availability at the start of the acceleration.

During the further process, when the at least one exhaust-gas turbocharger responds and generates a charge pressure in the intake system, the control offset $\Delta$ is then increased again, that is to say the inlet-side opening duration is lengthened again, in a manner dependent on said charge pressure. This approach makes allowance for the fact that the knocking tendency likewise increases with increasing charge pressure. Knocking is prevented according to the present application in that the effective compression ratio $\epsilon_{eff}$ is lowered by way of a lengthening of the inlet-side opening duration, specifically by way of a retarded closure of the second inlet valve. Here, with the inlet still open, a part of the cylinder fresh charge, that is to say charge air, is displaced into the intake system again. The higher the charge pressure is, the later the second inlet valve is closed, or the later the second inlet valve should be closed.

Method variants may be advantageous in which the throttle flap is fully opened in the presence of an abruptly increased load demand.

Method variants may be advantageous in which the control offset $\Delta$ is minimized during the course of the reduction.

Method variants may be advantageous in which the control offset $\Delta$ is additionally reduced by virtue of the first inlet valve being actuated later.

For the operation of a supercharged applied-ignition internal combustion engine, in which each piston belonging to a cylinder oscillates between a top dead center and a bottom dead center, method variants may be advantageous which are distinguished by the fact that, in the presence of the relatively low load before the increased load demand, the first inlet valve is closed before bottom dead center and the second inlet valve is closed after bottom dead center.

In this connection, method variants may be advantageous in which the control offset $\Delta$ is reduced by virtue of the second inlet valve being closed before bottom dead center.

Method variants may be advantageous in which a closing time $t_{intake,closing,2}$ at which the second inlet valve is closed is calculated in that, in a first method step, a base closing time $t_{intake,closing,base,2}$ is determined using a present engine speed $n_{mot}$ and a present desired value for the pressure $p_{intake,des}$ in the intake system, in a second method step, an additive closing time $\Delta t_{intake,closing,2}$ is determined using a present engine speed $n_{mot}$ and a present actual value for the pressure $p_{intake}$ in the intake system, and in a third method step, the closing time $t_{intake,closing,2}$ is calculated by adding the base closing time and the additive closing time, where $t_{intake,closing,2}=t_{intake,closing,base,2}+\Delta t_{intake,closing,2}$.

In the present case, a base closing time $t_{intake,closing,base,2}$ is initially determined, wherein the charge pressure and thus the supercharging may be ignored, that is to say disregarded. The charge pressure and thus the supercharging are first allowed for by way of a second additive component $\Delta t_{intake,closing,2}$.

A closing time retardation $\Delta_{tintake,closing,knock}$ which is determined according to the present application for the purposes of preventing knocking and by which the closure of the second inlet valve is to be retarded must then if appropriate additionally be taken into consideration, that is to say added, in the calculation of the closing time $t_{intake,closing,2}$.

In this connection, method variants may be advantageous in which, for the first method step, an ambient pressure $p_{atm}$ is predefined which is used as a maximum admissible desired value for the pressure $p_{intake,des}$ in the intake system and by means of which the desired value for the pressure $p_{intake,des}$ in the intake system in the determination of the base closing time is limited.

To ensure that the charge pressure and thus the supercharging are actually disregarded in the first method step, a maximum admissible desired value is predefined, specifically the ambient pressure $p_{atm}$, which may be for example 1013 hPa. In this case, the supercharged internal combustion engine is considered as a naturally aspirated engine.

In this connection, method variants may be likewise advantageous in which, for the second method step, an ambient pressure $p_{atm}$ is predefined which is subtracted from the present actual value for the pressure $p_{intake}$ in the intake system in order to determine a charge pressure difference $\Delta p_{charge}$, the additive closing time $\Delta t_{intake,closing,2}$ being determined using said charge pressure difference $\Delta p_{charge}$ if $\Delta p_{charge} > 0$.

To ensure that only the effect generated by the supercharging or the charge pressure is taken into consideration in the second method step, the ambient pressure $p_{atm}$ is subtracted from the actual pressure $p_{intake}$ in the intake system, thus forming a charge pressure difference $\Delta p_{charge}$. The second method step then provides an additive closing time $\Delta t_{intake,closing,2}$ only if $\Delta p_{charge} > 0$, that is to say if the at least one exhaust-gas turbocharger responds and generates a charge pressure in the intake system.

Referring specifically to FIG. 1, it includes a schematic diagram showing one cylinder of multi-cylinder internal combustion engine 100. Engine 100 may be controlled at least partially by a control system including controller 120 and by input from a vehicle operator 132 via an input device 130. In this example, input device 130 includes an accelerator pedal and a pedal position sensor 134 for generating a proportional pedal position signal PP.

Combustion cylinder 30 of engine 100 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 100.

Figure 2:
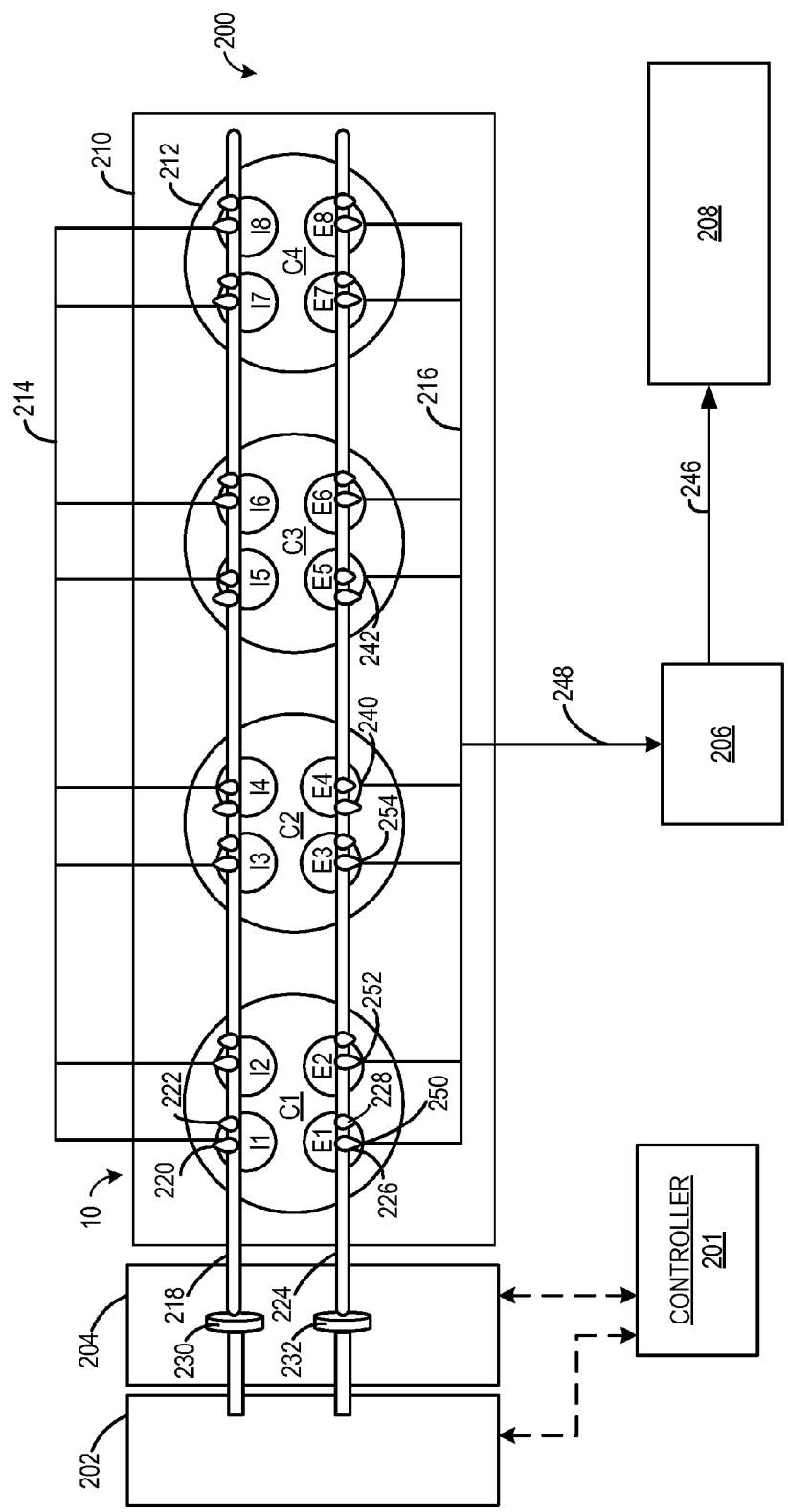
FIG. 2 shows a simplified internal combustion engine with multiple cylinders and an example cam actuation system.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves such as shown in FIG. 2 and further elaborated below.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), cam-in-cam (CiC), variable cam timing (VCT), variable valve timing (VVT) and/or variable valve lift (VVL) systems that may be operated by controller 120 to vary valve operation. The position of intake valve 52 and exhaust valve 54 may be determined by position sensors 55 and 57, respectively or via camshaft sensors.

Combustion cylinder 30 includes a fuel injector 66 arranged in intake passage 42 in a configuration that provides what is known as port injection of fuel into the intake port upstream of combustion cylinder 30. Fuel injector 66 injects fuel therein in proportion to the pulse width of signal FPW received from controller 120 via electronic driver 68. Alternatively or additionally, in some embodiments the fuel injector may be mounted on the side of the combustion cylinder or in the top of the combustion cylinder, for example, to provide what is known as direct injection of fuel into combustion cylinder 30. Fuel may be delivered to fuel injector 66 by a fuel delivery system (not shown) including a fuel tank, a fuel pump, and a fuel rail.

Intake passage 42 may include a throttle 62 having a throttle plate 64. In this particular example, the position of throttle plate 64 may be varied by controller 120 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 121 and a manifold air pressure sensor 122 for providing respective signals MAF and MAP to controller 120.

Ignition system 88 can provide an ignition spark to combustion chamber 30 via spark plug 92 in response to spark advance signal SA from controller 120, under select operating modes. Though spark ignition components are shown, in some embodiments, combustion chamber 30 or one or more other combustion chambers of engine 100 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 120 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 120 may receive various signals and information from sensors coupled to engine 100, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. Controller 120 may also include a knock regulator to monitor knock based on various signals from sensors, such as in-cylinder pressure sensors, ambient temperature sensors, and/or air charge temperature sensors, for example.

Engine 100 may further include a compression device such as a turbocharger 190 or supercharger including at least a compressor 94 arranged along intake manifold 44. For a turbocharger, compressor 94 may be at least partially driven by a turbine 94 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 120. Further, a sensor 123 may be disposed in intake manifold 44 for providing a BOOST signal to controller 120.

As mentioned previously, intake valve 52 and exhaust valve 54 may be controlled by cam actuation. As such, an example cam actuation system 200 is shown in FIG. 2, which may be used with engine 10 of FIG. 1, where engine 10 is also simply outlined in FIG. 2. Cam actuation system 200 may include a variable cam timing (VCT) system 202 and a cam profile switching (CPS) system 204, and/or other similar cam systems. Furthermore, a turbocharger 206, a catalyst 208, and a cylinder head 210 with a plurality of cylinders 212 may be present.

Engine 10 is shown having an intake manifold 214 configured to supply intake air and/or fuel to the cylinders 212 and an integrated exhaust manifold 216 configured to exhaust the combustion products from the cylinders 212. Exhaust manifold 216 may include an outlet 248 to couple to turbocharger 206 while an exhaust passage 246 may couple turbocharger 206 to catalyst 208. While in the embodiment depicted in FIG. 2, intake manifold 214 is separate from cylinder head 210 while exhaust manifold 216 is integrated in cylinder head 210, in other embodiments, intake manifold 214 may be integrated and/or exhaust manifold 216 may be separate from cylinder head 210.

Cylinder head 210 includes four cylinders, labeled C1-C4. Cylinders 212 may each include a spark plug and a fuel injector for delivering fuel directly to the combustion chamber, as described above in FIG. 1. However, in alternate embodiments, each cylinder may not include a spark plug and/or direct fuel injector. Cylinders may each be serviced by one or more valves. In the present example, cylinders 212 each include two intake (inlet) valves and two exhaust valves. Each intake and exhaust valve is configured to open and close an intake port and exhaust port, respectively. The intake valves are labeled I1-I8 and the exhaust valves are labeled E1-E8. Cylinder C1 includes intake valves I1 and I2 and exhaust valves E1 and E2; cylinder C2 includes intake valves I3 and I4 and exhaust valves E3 and E4; cylinder C3 includes intake valves I5 and I6 and exhaust valves E5 and E6; and cylinder C4 includes intake valves I7 and I8 and exhaust valves E7 and E8. Each exhaust port of each cylinder may be of equal diameter. However, in some embodiments, some of the exhaust ports may be of different diameter.

Each intake valve is moveable between an open position allowing intake air into a respective cylinder and a closed position substantially blocking intake air from the respective cylinder. Further, FIG. 2 shows how intake valves I1-I8 may be actuated by a common intake camshaft 218. Intake camshaft 218 includes a plurality of intake cams configured to control the opening and closing of the intake valves. Intake camshaft 218 may be a cam-in-cam which may comprise two camshaft sections, for example, where a first cam is arranged on the first camshaft section, and a second cam is arranged on a second camshaft section. One camshaft section may be an outer camshaft section and may be hollow, having the other, inner camshaft section arranged inside of the first section in a rotatable fashion. The camshaft sections may be rotatable relative to each other, and therefore the first and second cams arranged on the respective camshaft sections are rotatable relative to each other. Each intake valve may be controlled by first intake cams 220 and second intake cams 222. Further, in some embodiments, one or more additional intake cams may be included to control the intake valves. In the present example, first intake cams 220 have a first cam lobe profile for opening the intake valves for a first intake duration. Further, in the present example, second intake cams 222 have a second cam lobe profile for opening the intake valve for a second intake duration. In one example, the time between the opening of first intake valve and the closing of the second intake valve (control offset A) may be shortened or lengthened depending on engine operating conditions and load as discussed further below and shown in FIGS. 3-6. The control offset Δ may be adjusted by advancing the actuation of a first intake valve of a cylinder and/or retarding a second intake valve of the same cylinder. Further, the timing of the intake valves may be corrected for turbocharging and knock effects as elaborated on in FIGS. 4-6. The second intake duration may be a shorter intake duration (shorter than the first intake duration), the second intake duration may be a longer intake duration (longer than the first duration), or the first and second duration may be equal. Additionally, intake camshaft 218 may include one or more null cam lobes. Null cam lobes may be configured to maintain respective intake valves in the closed position.

Each exhaust valve is moveable between an open position allowing exhaust gas out of a respective cylinder of the cylinders 212 and a closed position substantially retaining gas within the respective cylinder. Further, FIG. 2 shows how exhaust valves E1-E8 may be actuated by a common exhaust camshaft 224. Exhaust camshaft 224 includes a plurality of exhaust cams configured to control the opening and closing of the exhaust valves. Each exhaust valve may be controlled by first exhaust cams 226 and second exhaust cams 228. Further, in some embodiments, one or more additional exhaust cams may be included to control the exhaust valves.

An integrated exhaust manifold 216, included within the engine cylinder head, may also be provided and configured with one or multiple outlets to selectively direct exhaust gas to various exhaust components. Integrated exhaust manifold 216 may include multiple separate exhaust manifolds, each having one outlet. Furthermore, the separate exhaust manifolds may be included in a common casting in cylinder head 210. In this present example, integrated exhaust manifold 216 includes the single outlet 248 coupled to turbocharger 206.

Additional elements not shown may further include push rods, rocker arms, hydraulic lasher adjusters, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve, or more than two intake and/or exhaust valves. In still other examples, exhaust valves and intake valves may be actuated by a common camshaft. However, in an alternate embodiment, at least one of the intake valves and/or exhaust valves may be actuated by its own independent camshaft or other device.

As described above, FIG. 2 shows a non-limiting example of cam actuation system and associated intake and exhaust systems. It should be understood that in some embodiments, the engine may have more or fewer combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single cam actuation system may be used to control valve operation of a group of cylinders, or separate cam actuation systems may be used.

Figure 3:
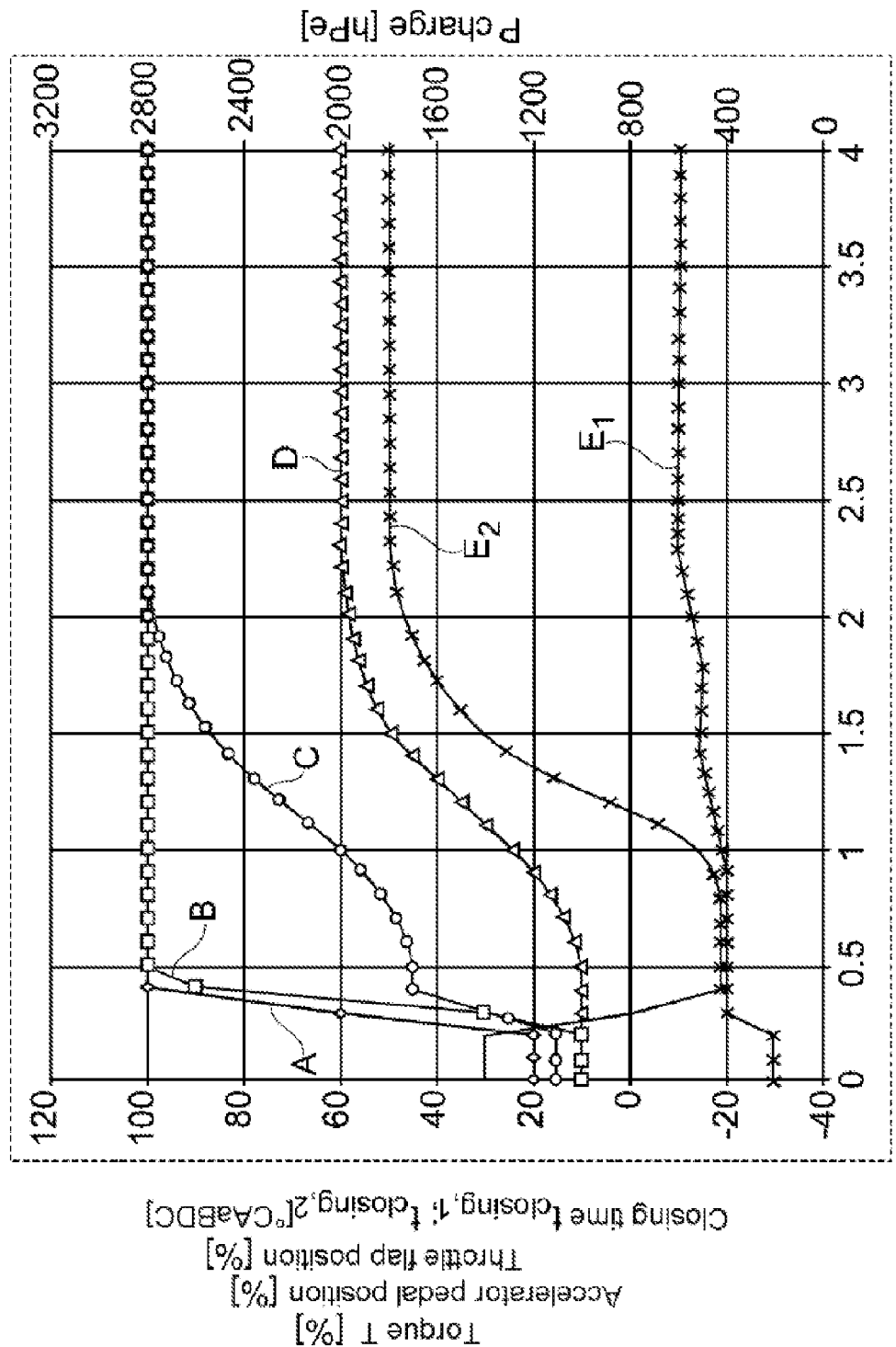
FIG. 3 schematically shows, in a diagram, operating parameters of the internal combustion engine in the event of a step change in load.

FIG. 3 schematically shows, in a diagram, operating parameters of the internal combustion engine in the event of a step change in load. In the present case, the internal combustion engine is used as a drive for a motor vehicle and has two inlet openings per cylinder.

In the illustration, on the left-hand ordinate, the position of the accelerator pedal [%] is plotted as curve A, the position of the throttle flap [%] is plotted as curve B, the torque [%] is plotted as curve C, and the closing times $t_{closing,1}$ and $t_{closing,2}$ of the first and second inlet valves in degrees crank angle after bottom dead center of the charge exchange [°CAaBDC] are plotted as curve E1 and E2 respectively. On the right-hand ordinate, the pressure $p_{intake}$ in the intake system or the charge pressure $p_{charge}$ in [hPa] is plotted as curve D. The time t in seconds is plotted on the abscissa.

The load demand is abruptly increased by actuation of the accelerator pedal. The throttle flap is opened, specifically to its full extent, virtually without a delay.

Triggered by the abruptly increased load demand, the control offset Δ of the inlet valves is reduced by virtue of the second inlet valve being closed earlier. As shown in FIG. 3, in the presence of low load before the load increase, the first inlet valve is closed earlier than the second inlet valve. At that time t, the closing times have a large control offset Δ in order to realize a long inlet-side opening duration. This may have advantages in the presence of low load.

In the present case, the control offset Δ is minimized in the presence of increased load demand, whereby the inlet-side opening duration is shortened. A shorter inlet-side opening duration is intended to ensure the best possible charging of the at least one cylinder, and thus a high torque availability at the start of the acceleration.

When the exhaust-gas turbocharging arrangement responds and generates charge pressure $p_{charge}$ the control offset Δ is then increased again, that is to say the inlet-side opening duration is lengthened again, specifically by retarded closure of the second inlet valve, in a manner dependent on said charge pressure $p_{charge}$. In this way, the effective compression ratio $\epsilon_{eff}$ is lowered, and knocking may be prevented. With the second inlet valve open, a part of the charge air is displaced into the intake system again. The higher the charge pressure, the later the second inlet valve is closed.

Figure 4:
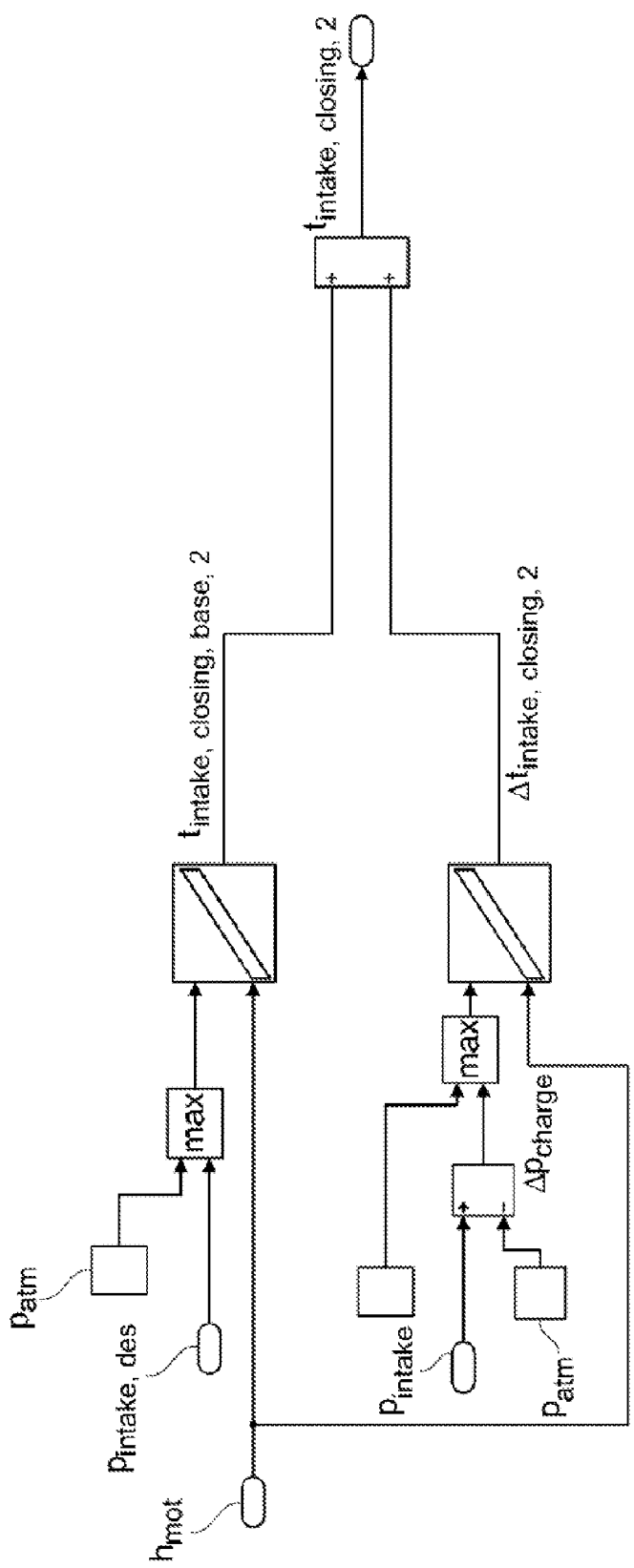
FIG. 4 schematically shows, in a diagram, the determination of the closing time of the second inlet valve.

The timings of the inlet valves of a cylinder may be varied. FIG. 4 schematically shows, in a diagram, the determination of the closing time $t_{intake,closing,2}$ of the second inlet valve.

In a first method step, using the engine speed $n_{mot}$ of the internal combustion engine and a desired value for the pressure $p_{intake,des}$ in the intake system, a base closing time $t_{intake,closing,base,2}$ is determined (upper branch). In this case, the ambient pressure $p_{atm}$ is predefined as the maximum admissible desired value for the pressure $p_{intake,des}$ in the intake system. Supercharging effects, if present, may be thus disregarded.

In a second method step, using the engine speed $n_{mot}$ and the actual pressure $p_{intake}$ in the intake system, an additive closing time $\Delta t_{intake,closing,2}$ is determined, and thus allowance is made for the supercharging (lower branch).

Here, a charge pressure difference $\Delta p_{charge}$ is determined by virtue of the ambient pressure $p_{atm}$ being subtracted from the actual pressure $p_{intake}$ in the intake system. The additive closing time $\Delta t_{intake,closing,2}$ is then determined using said charge pressure difference $\Delta p_{charge}$, but only if $\Delta p_{charge} > 0$. The second method step provides an additive closing time $\Delta t_{intake,closing,2}$ only if the exhaust-gas turbocharging arrangement generates a charge pressure $p_{charge} > p_{atm}$ in the intake system. In a third method step, the closing time $t_{intake,closing,2}$ is calculated by adding the base closing time, the additive closing time, and the closing time retardation, as $t_{intake,closing,2} = t_{intake,closing,base,2} + \Delta t_{intake,closing,2}$.

Figure 5:
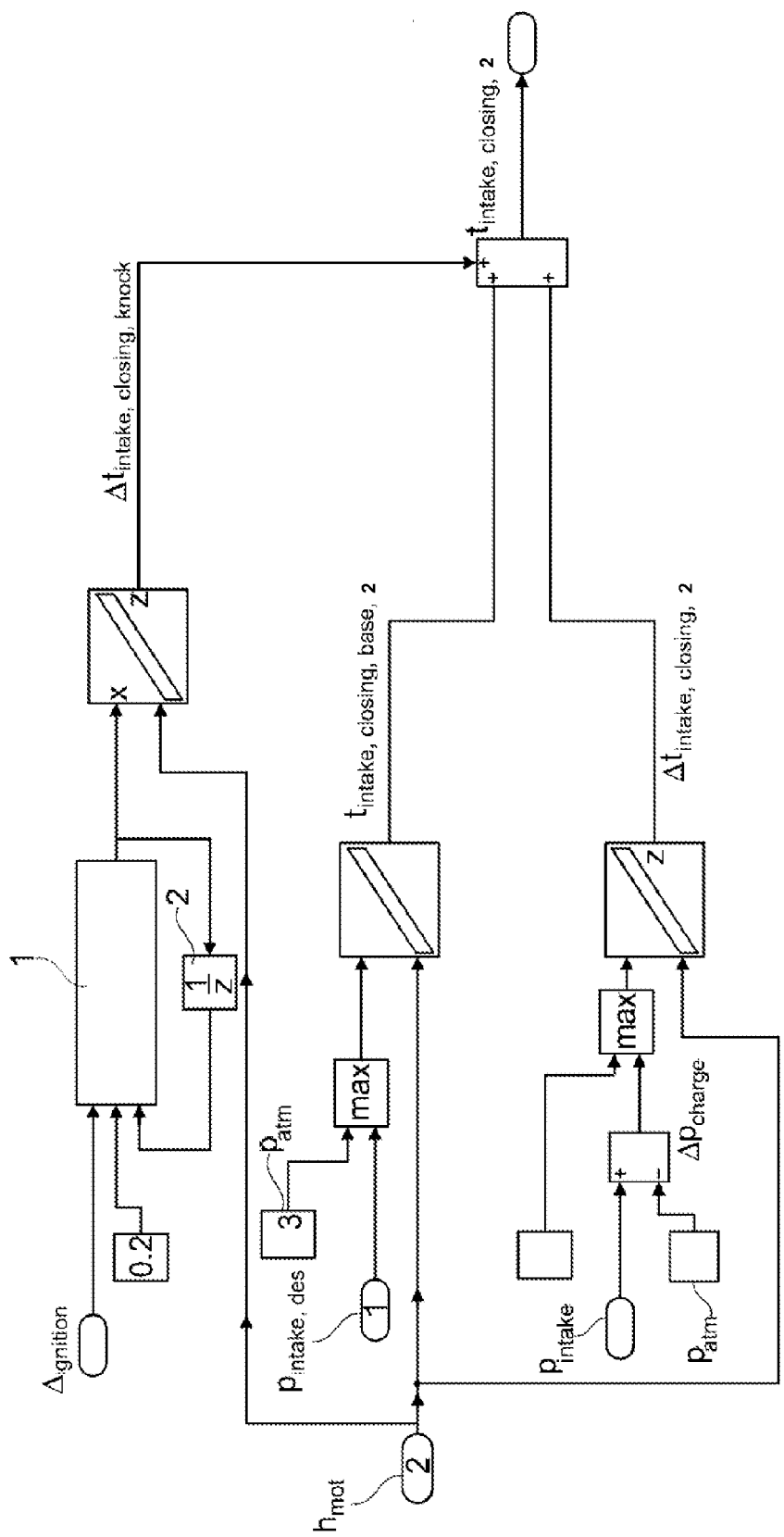
FIG. 5 schematically shows, in a diagram, the determination of the closing time of the second inlet valve including a correction for knock.

Additionally, knock risk may be accounted for as shown in FIG. 5, which includes a third branch in the determination of the closing time of the second inlet valve as shown in FIG. 4. If there is a risk of knocking, the knock regulator of the internal combustion engine outputs an ignition retardation $\Delta_{ignition}$ by which the ignition is to be retarded in order that knocking combustion may be reliably prevented.

Then, using the present engine speed $n_{mot}$ and the ignition retardation $\Delta_{ignition}$ output by the knock regulator, a closing time retardation $\Delta t_{intake,closing,knock}$ is determined by which the closure of the second inlet valve is to be retarded for the purpose of reducing the effective compression ratio (upper branch). In this case, the ignition retardation $\Delta_{ignition}$, which serves as input signal, is passed through a low-pass filter 1 and a delay element 2 (1/z). This makes allowance for the different response behaviors of an ignition adjustment and of a variable valve drive. For the adjustment of the valve drive, sufficient time should be available in order that the closing time of the second inlet valve can be adjusted. The delay ensures that the knock regulator, owing to the adjustment of the closing time of the second inlet valve, regards the originally intended ignition retardation $\Delta_{ignition}$ as being no longer necessary. This results in higher efficiency.

A closing time retardation $\Delta t_{intake,closing,knock}$ which is determined for the purposes of preventing knocking and by which the closure of the second inlet valve is to be retarded must then additionally be taken into consideration, that is to say added, in the calculation of the closing time $t_{intake,closing,2}$ (upper branch).

The closing time $t_{intake,closing,2}$ is calculated by adding the base closing time, the additive closing time, and the closing time retardation, as $t_{intake,closing,2} = t_{intake,closing,base,2} + \Delta t_{intake,closing,2} + \Delta t_{intake,closing,knock}$.

Figure 6:
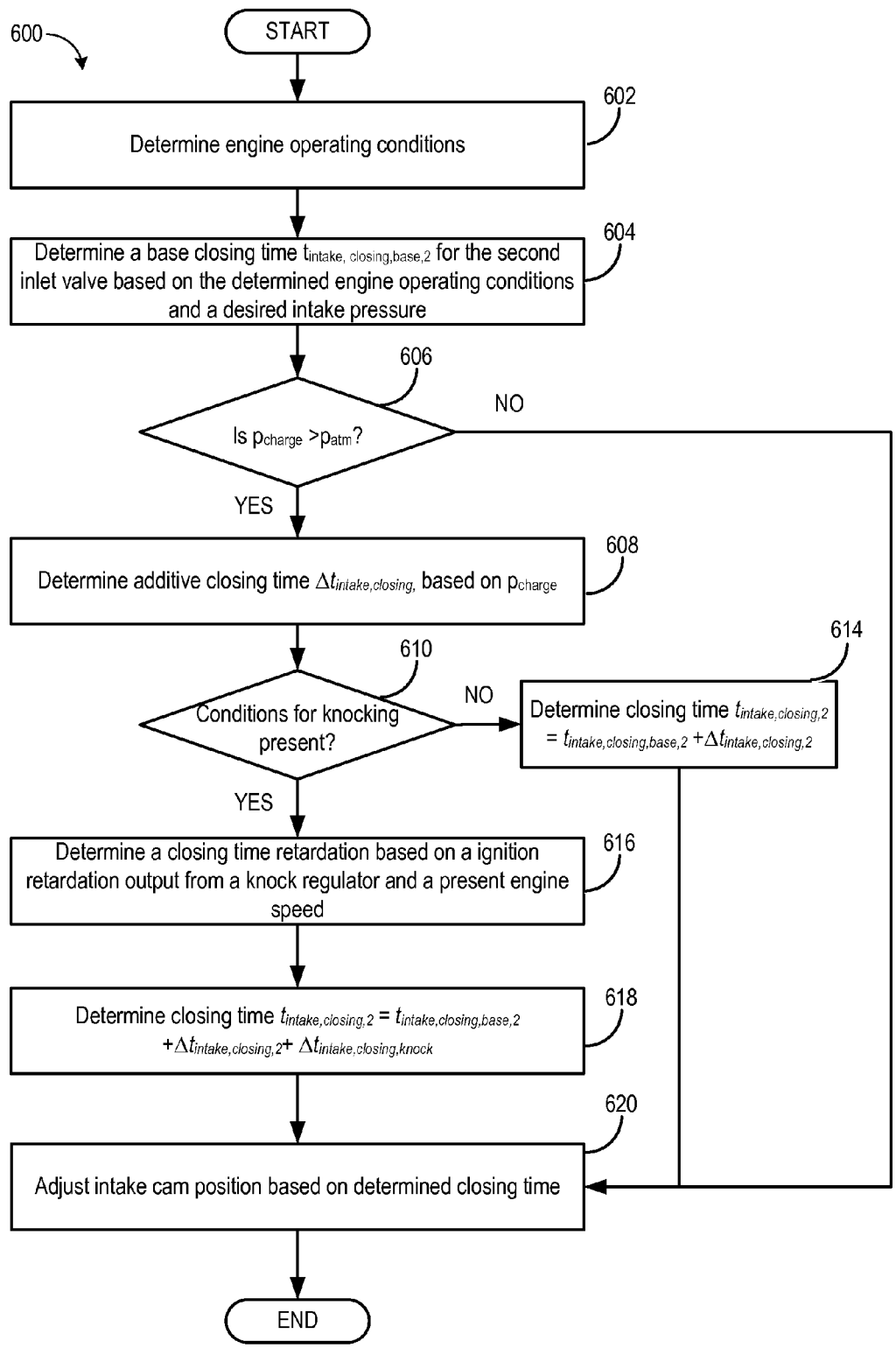
FIG. 6 is an example method flowchart for determining intake valve timing.

Turning now to FIG. 6, an example method 600 may be executed by an engine controller (e.g., controller 120) via instructions stored in non-transitory memory for determining the closing time of a second inlet valve in order to control the offset timing between the opening of a first inlet valve and the closing of the second inlet valve, for example.

At 602, the method may determine the engine operating conditions. The engine operating conditions may include, for example, ambient temperature and pressure, engine speed, intake pressure, spark retard, etc. The operating conditions may be measured and/or estimated.

At 604, the method may determine a base closing time $t_{intake,closing,base,2}$ for the second inlet valve based on the determine engine operating conditions determined at 502 and a desired intake pressure. For example, the base closing time may be determined based on a function of desired intake pressure and actual engine speed. The desired intake pressure may be determined via a lookup table, for example, wherein the table contains setpoints to optimize for high torque and quick response. In this way, optimal values may be determined while the engine is naturally aspirated, such as when the throttle opens but before turbocharging occurs, as can be seen in FIG. 3 between 0 and 0.5 seconds, for example.

At 606, the method may determine whether charge pressure is greater than ambient pressure. Charge pressure may be determined by subtracting ambient pressure from the actual intake pressure. Thus, action 606 may determine when a turbocharger, such as turbocharger 190, starts to build up boost pressure such that $\Delta p_{charge} > 0$.

If yes at 606, the method may proceed to action 608, wherein additive closing time is determined based on the charge pressure. For example, the additive closing time may be determined by the charge pressure e.g., the actual intake pressure above the ambient pressure, and the actual engine speed. Thus, action 608 may be a correction in the timing of the second inlet valve to account for turbocharging. If no at 606, the method may proceed to action 620.

At 610, the method may determine whether condition for knock is present. For example, it may be determined whether air charge temperature is greater than a threshold temperature. The engine may be knock-limited due to higher ambient temperatures or because of a low octane fuel, for example, which may increase the air charge temperature.

If no at 610, the method may determine at 614 the closing time of the second inlet valve which is the addition of the base intake closing time determined at 604 and the additive closing time determined at 608. The method may then proceed to action 620.

If yes at 610, the method may determine at 616 a closing time retardation based on an ignition retardation output from a knock regulator and a present engine speed. For example, an average of the cylinder individual spark retard from the knock control may be filtered and then used as an input with engine speed to determine a closing time retardation of the second inlet valve. Further, the ignition retardation output may additionally be passed through a delay element, such as delay element 2 of FIG. 5. The delay element may allow for reducing retardation of ignition time, thus reducing its associated efficiency losses.

At 618, the method may determine closing time of the second inlet valve. The closing time may be determined by $t_{intake,closing,base,2} + \Delta t_{intake,closing,2} + \Delta t_{intake,closing,knock}$. Thus, the closing time of the second inlet valve may be corrected for turbocharging and knock limitations.

At 620, the method may include adjusting intake cam position based on the determined closing time. For example, based on the determined closing time, an engine controller may have instructions stored in non-transitory memory to adjust the position of the cams to retard the closing time of the second inlet valve and/or advance the opening time of the first intake valve. The intake valves may be actuated to lengthen the time between the opening of a first inlet valve, e.g., inlet valve I1 of FIG. 2, and the closing of a second inlet valve, e.g., inlet valve I2. For example, at least the second inlet valve may be closed later and after bottom dead center. In another example, the controller may adjust a cam actuation system, such as cam actuation system 51, based on the determined closing time in order to actuate the intake valves via cams on a cam-in-cam system.

In this way, the method may optimize efficiency in different load conditions for a turbocharged direct injection internal combustion engine, for example, and may account for more robust knock control without sacrificing the efficiency associated with retarding ignition time. For example, the method may optimize the shift of a second cam to actuate a second inlet valve in relation to a first cam at steady state conditions and at transient conditions, such as when the load shifts from low to high.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a supercharged applied-ignition internal combustion engine, comprising:
   actuating a first inlet valve and a second inlet valve of a cylinder of the engine by rotationally offsetting cams respectively coupled to the first inlet valve and the second inlet valve thereby forming a control offset ($\Delta$);
   actuating the first inlet valve earlier than the second inlet valve at a low load demand;
   opening a throttle flap and reducing the control offset ($\Delta$) by actuating the second inlet valve earlier than when actuated to form the control offset ($\Delta$) at an increasing load demand over time; and
   increasing the control offset ($\Delta$) dependent on a charge pressure generated in an intake system by exhaust-gas turbocharging by actuating the second inlet valve later than when actuated to form the control offset ($\Delta$).

2. The method as claimed in claim 1, wherein the throttle flap is opened fully in the presence of the increasing load demand.

3. The method as claimed in claim 1, wherein the control offset ($\Delta$) is additionally reduced by actuating the first inlet valve later than when actuated to form the control offset ($\Delta$).

4. The method as claimed in claim 3, in which a piston belonging to the cylinder oscillates between a top dead center and a bottom dead center, wherein in the presence of the low load demand before the increasing load demand, the first inlet valve is closed before bottom dead center and the second inlet valve is closed after bottom dead center.

5. The method as claimed in claim 4, wherein the control offset ($\Delta$) is reduced by the second inlet valve being closed before bottom dead center.

6. The method as claimed in claim 3, further comprising calculating a closing time ($t_{intake,closing,2}$) at which the second inlet valve is closed by:
   determining a base closing time ($t_{intake,closing,2}$) using a present engine speed ($n_{mot}$) and a present desired value for a pressure ($p_{intake,des}$) in the intake system;
   determining an additive closing time ($\Delta t_{intake,closing,2}$) using the present engine speed ($n_{mot}$) and a present actual value for a pressure ($p_{intake}$) in the intake system; and
   calculating the closing time ($t_{intake,closing,2}$) by adding the base closing time and the additive closing time, where $t_{intake,closing,2} = t_{intake,closing,base,2} + \Delta t_{intake,closing,2}$.

7. The method as claimed in claim 6, further comprising adjusting the closing time ($t_{intake,closing,2}$) by a filtered average cylinder individual spark retard from a knock control and the present engine speed ($n_{mot}$) to obtain a closing time retardation ($\Delta t_{intake,closing,knock}$) where $t_{intake,closing,2} = t_{intake,closing,base,2} + \Delta t_{intake,closing,2} + t_{intake,closing,knock}$.

8. The method as claimed in claim 6, wherein, a predefined ambient pressure ($p_{atm}$) is used as a maximum admissible desired value for the pressure ($p_{intake,des}$) in the intake system so that the desired value for the pressure ($p_{intake,des}$) in the intake system in the determination of the base closing time is limited.

9. The method as claimed in claim 8, wherein the predefined ambient pressure ($p_{atm}$) is subtracted from the present actual value for the pressure ($p_{intake}$) in the intake system in order to determine a charge pressure difference ($\Delta p_{charge}$), the additive closing time ($\Delta t_{intake,closing,2}$) being determined using said charge pressure difference ($\Delta p_{charge}$) if $\Delta p_{charge} > 0$.

* * * * *